United States Patent [19]

Godsey

[11] 4,326,249
[45] Apr. 20, 1982

[54] INTERRUPT SYSTEM AND METHOD
[75] Inventor: Ernest E. Godsey, Tucson, Ariz.
[73] Assignee: Burr-Brown Research Corp., Tucson, Ariz.
[21] Appl. No.: 27,903
[22] Filed: Apr. 6, 1979

Related U.S. Application Data

[62] Division of Ser. No. 890,121, Mar. 27, 1978, Pat. No. 4,181,941.

[51] Int. Cl.³ .............................................. G06F 3/00
[52] U.S. Cl. .................................................. 364/200
[58] Field of Search ... 364/200 MS File, 900 MS File

[56] References Cited
U.S. PATENT DOCUMENTS

| | | | |
|---|---|---|---|
| 3,673,576 | 6/1972 | Donaldson | 364/200 |
| 3,681,761 | 8/1972 | Schuenemann | 364/200 |
| 4,075,691 | 2/1978 | Davis et al. | 364/200 |

Primary Examiner—Raulfe B. Zache
Assistant Examiner—John G. Mills
Attorney, Agent, or Firm—Cahill, Sutton & Thomas

[57] ABSTRACT

Method and system for responding to an interrupt signal sent to a microprocessor from one of a plurality of peripheral devices. An acknowledge signal is transmitted from the microprocessor to the peripheral devices. The acknowledge signal operatively isolates select/request terminals of the respective peripheral devices from outputs of a select code decoder. The acknowledge signal also enables the select/request terminals to be inputted to a priority encoder. The acknowledge signal further enables a signal to be produced on the select/request terminal of the interrupting peripheral device, thereby causing the priority encoder to produce a select code representative of the interrupting peripheral device. The select code is subsequently inputted to the microprocessor to enable the microprocessor to access an interrupt service subroutine for the interrupting peripheral device. Subsequent to the end of the acknowledge signal, the select code is inputted by the microprocessor to a select code decoder and is decoded thereby to produce an enable signal which is transmitted to the select/request terminal of the interrupting peripheral device. The enable signal enables the interrupting peripheral device to communicate with the microprocessor via the data bus, thereby permitting the interrupting peripheral device to be serviced by the accessed interrupt service subroutine.

2 Claims, 9 Drawing Figures

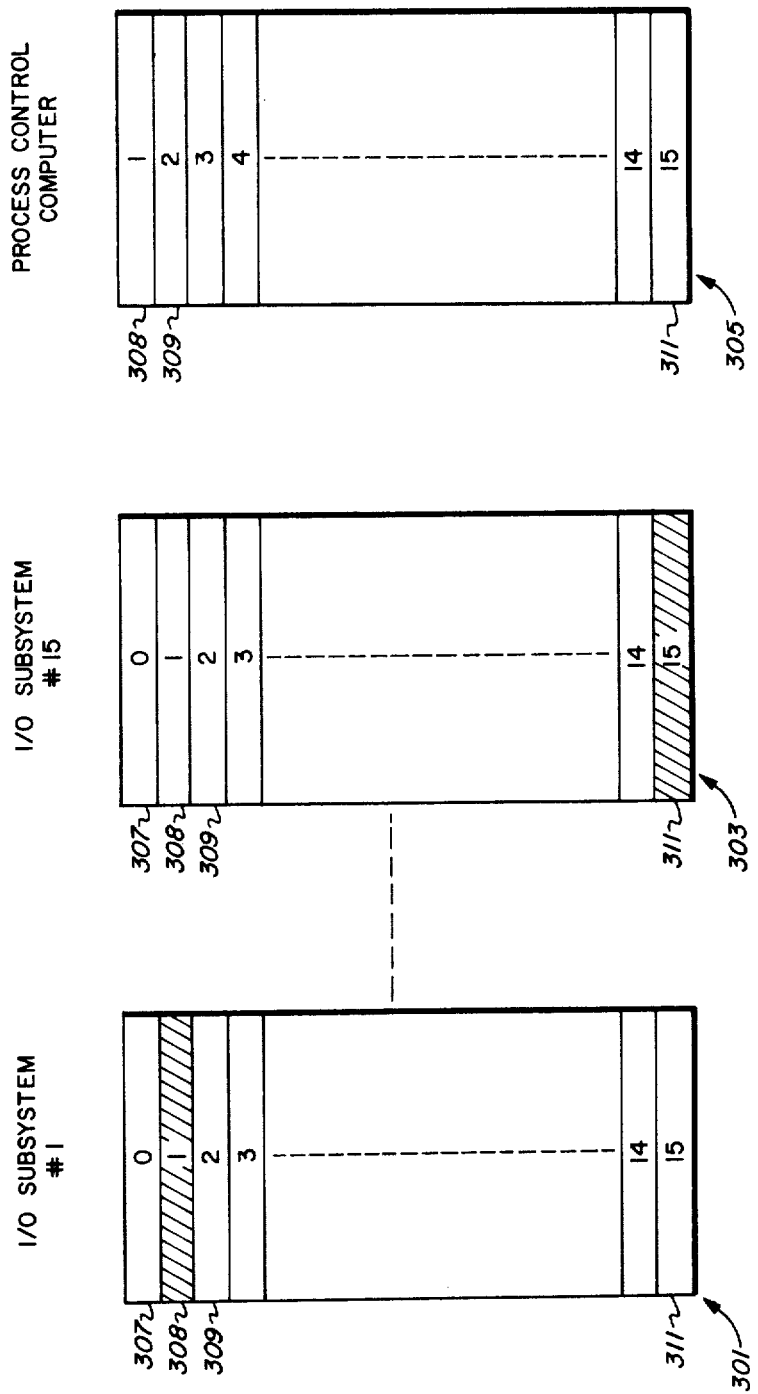

INTERRUPT SYSTEM AND METHOD

This is a division of application, Ser. No. 890,121, field Mar. 27, 1978, now U.S. Pat. No. 4,181,941.

BACKGROUND OF THE INVENTION

The invention relates to systems and methods for operating a computing system in response to an interrupting peripheral device.

Various sytems and methods have been utilized to operate a computing system in response to an interrupting peripheral device. One known system includes an interrupt conductor connected to the input of a processor and connected to an interrupt output of all peripheral devices of the system. The processor responds to an interrupt request signal on the interrupt conductor by vectoring to a software polling subroutine. The polling subroutine polls the peripheral devices of the system by addressing each of them in a prioritized order to determine which peripheral device generated the interrupt request. Once the processor determines, by means of the polling operation, which peripheral device produced the interrupt request, the processor refers to a stored table to obtain the address of the appropriate interrupt request service subroutine. However, use of software polling systems to establish priority of interrupting peripheral devices is unsatisfactory for a system such as a typical industrial control system which has a large number of peripheral devices, because of the large amount of time required to poll all of the peripheral devices every time an interrupt request signal is generated by the equipment being controlled by the computing system. This is especially true in a system which is operating at a speed close to its maximum speed. Industrial control systems typically do operate at a rate close to their maximum rate because relatively inexpensive, low speed microprocessors, memories and associated logic circuitry are utilized.

Another type of commonly utilized interrupt scheme is referred to as a "daisy chained" interrupt system. In a daisy chained interrupt system, the peripheral devices are serially connected so that if one of the peripheral devices generates an interrupt request signal, the processor produces an "acknowledge" signal which is provided as an input to the highest priority peripheral device. Each peripheral device gates the acknowledge signal to the next peripheral device if the first peripheral device is not the one which produced the interrupt request signal. The peripheral devices are sequentially connected in order of the priority of their respective interrupt request signals. The daisy chained interrupt system may identify the interrupting peripheral device more rapidly than a polled interrupt system, but has the disadvantages that if a particular peripheral device is removed from the system for some reason, the prioritizing system becomes inoperative, and the system further requires additional gating circuitry to be incorporated in each peripheral device.

Other interrupt techniques involve multiple interrupt lines, one from each peripheral device, connected to a priority encoding circuit which immediately generates the address of the appropriate interrupt service subroutine. Such systems require the interrupt service subroutine to generate the address information necessary to select the interrupting peripheral device to enable it to communicate with the processor. Such systems therefore require a great deal of hardware (multiple inerrupt lines and address generating circuitry) and additional software to select and enable the interrupting peripheral device.

Certain data processing systems, including typical industrial control systems, need to be able to operate utilizing relatively slow, inexpensive microprocessors and peripheral devices. Such systems typically involve very large numbers of peripheral devices. Such industrial control systems therefore are not well suited for utilization of software priority determining polling routines, and further need the flexibility of being capable of operation when one or more peripheral devices are temporarily removed, and usually must be implemented at minimum cost, and therefore are not well suited to any of the above types of interrupt systems.

There exists a need for an interrupt system which rapidly established priority of interrupt requests from peripheral devices in a minimum amount of time, utilizing less hardware than known priority interrupt systems, while placing a minimum software burden on the system programmer.

The following patents are believed to generally indicate the state of the art for priority interrupt systems and methods: U.S. Pat. Nos. 3,208,048; 3,675,209; 3,710,324; 3,828,325; 3,909,790; 3,924,240; 4,003,033; 4,020,472; 4,027,290; and 4,037,204.

SUMMARY OF THE INVENTION

It is an object of the invention to provide a system and method for efficiently accessing peripheral devices in a computing system.

It is another object of the invention to provide a system and method for reducing the amount of "overhead" program execution by a main processor in a system including a plurality of subsystems each containing a plurality of peripheral devices connecting the system to a device to be controlled.

Briefly described, and in accordance with one embodiment thereof, the invention provides a control system and method for interrupting peripheral devices. The control system includes a processor and a plurality of peripheral devices coupled to the processor by means of a bus. An interrupt conductor connected to all of the peripheral devices inputs a interrupt request signal from one of the peripheral devices to the processor. The processor transmits acknowledge message to all of the peripheral devices in response to the interrupt request signal. The interrupting peripheral device is enabled in response to the acknowledge message to transmit an encode signal via a conductor to an encoder, which produces a code representing the identity of the interrupting peripheral device. Subsequently, a select signal is produced in response to the code and transmitted to the interrupting peripheral device via the same conductor. The acknowledge message is utilized to operatively disable the conductor from circuitry producing the select signal and to operatively enable the conductor to input the encode signal to the input of the encoder during the enabling of the peripheral device in response to the acknowledge message.

In one embodiment of the invention a method and control system are provided wherein a control computer and a plurality of I/O subsystems each include first and second groups of peripheral devices. First and second groups of peripheral address bits are transmitted from the control computer to a microcomputer in each of the input/output subsystems. The first and second groups of peripheral address bits are transmitted by the microcomputer along first and second groups of conductors, respectively, of an internal bus of each I/O subsystem if the second group of address bits does not contain a first code. If one of the I/O subsystems stores a second code contained in the second group of peripheral address bits, that I/O subsystem is enabled to be accessed by the microcomputer of that I/O subsystem. If the microcomputer of one of the I/O subsystems transmits the first predetermined code, along the second group of conductors of that I/O subsystem, the first group of peripheral devices in that I/O subsystem will be enabled to be accessed by that microcomputer.

BRIEF DESCRIPTION OF THE DRAWINGS

FIG. 6 is a diagram showing memory maps of microprocessors in the I/O subsystems and the process control computer of the system of FIG. 1.

DESCRIPTION OF THE INVENTION

Figure 1:
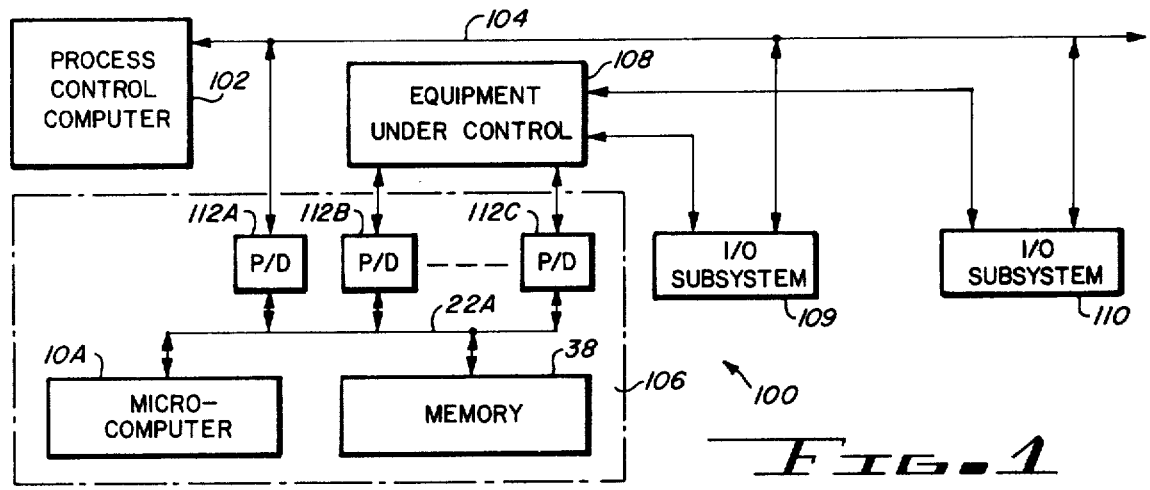
FIG. 1 is a block diagram of an industrial process control system.

Referring to FIG. 1, a generalized industrial process control system 100 includes a process control computer 102 connected to a bidirectional communications bus 104. A plurality of input/output subsystems (hereinafter I/O subsystems) 106, 108, and 110 are connected to communications bus 104. Process control computer 102 can be any commercially available computer (including a communications port) which has the necessary speed and computing power to provide all of the control information necessary to control the operation of a particular industrial process system. A typical suitable process control computer is the Hewlett Packard system 45 desk top computer, model 9845. Communications bus 104 can be a serial communications link, such as a telephone line and associated MODEMS and acoustical couplers, or it can be a "current loop", including a transmit line pair and a receive line pair of the type conventionally utilized, for example, to couple a teletype machine to a central processor.

Figure 2:
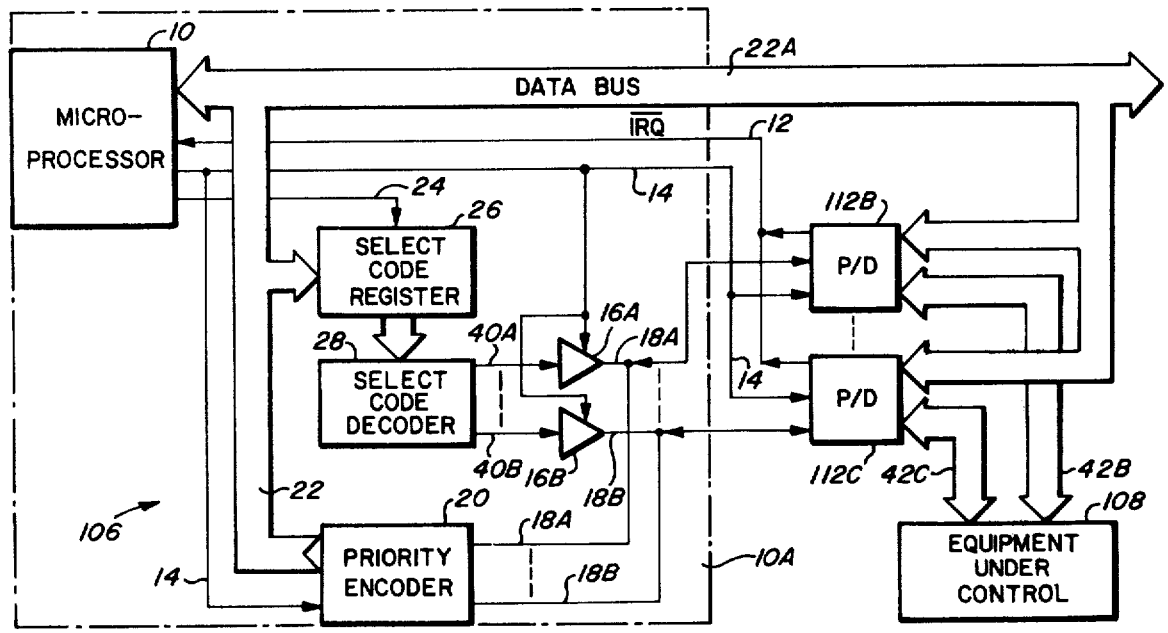
FIG. 2 is a block diagram of an input/output control subsystem of the process control system of FIG. 1.

I/O subsystem 106 is enlarged in FIG. 2 to show several of the elements thereof. I/O subsystem 106 incldues a microcomputer 10A, coupled to bus 22A, which includes an eight bit bidirectional data bus, an address bus, and various control lines. A plurality of peripheral devices such as 112B and 112C are coupled to equipment 108, which is indirectly controlled by process control computer 102 via microcomputer 10A and peripheral devices 112B and 112C. Equipment 108, which includes equipment specialized for controlling operations in a particular processing or manufacturing industrial environment, further produces data and service request inputs to the various peripheral devices, which data and service requests are fed back through the peripheral devices and the microcomputer in I/O subsystem 106 to process control computer 102. I/O subsystem 106 is not shown in detail in FIG. 1, but is shown in detail in subsequent drawings.

I/O subsystem 106 communicates with communications bus 104 by means of a specialized peripheral device 112A, which is coupled to bidirectional data bus 22A. Peripheral device 112A can include a MODEM if communications bus 104 is a telephone line, and may include parallel-to-serial and serial-to-parallel converters, in the form of commercially available UART (universal asynchronous receiver transmitter) devices.

As subsequently explained in more detail, each of I/O subsystems 106, 109, 110, etc., is capable of communicating with sixteen peripheral devices such as relays, analog to digital converters, and various other interface devices necessary to input control information to equipment 108, to receive data from equipment 108, and to request information from equipment 108. As explained subsequently, each of the I/O subsystems also contains first and second groups of 16 peripheral devices connected to the data bus 22A of that I/O subsystem. The first group of peripheral devices is addressable (indirectly, by means of microprocessor 10) by process control computer 102. Hereinafter, the peripheral devices of the first group of an I/O subsystem will be referred to simply as "peripheral devices" or "public peripheral devices". The second group of peripheral devices of an I/O subsystem are accessible only by the microprocessor 10 of that I/O subsystem, and cannot be accessed in response to any 8-bit address produced by process control computer 102. These peripheral devices of the second group of an I/O subsystem are hereinafter referred to as "overhead peripheral devices" or "private peripheral devices" to distinguish them from peripheral devices of the first group of that I/O subsystem. The present embodiment of the invention permits connecting of fifteen I/O subsystems to communications bus 104, such that an eight bit address outputted by process control computer 102 to the I/O subsystems can be utilized by the I/O subsystems to select one of 240 peripheral devices (i.e., 16 peripheral devices in each of the 15 I/O subsystems) which permit communication by process control computer 102 with equipment 108. The eight bit address includes four high order bits (DB4–DB7) which are utilized to "select" one of the I/O subsystems, referred to hereinafter as a "device group", and four lower order bits (DB$\phi$–DB3) utilized to select one of the sixteen peripheral devices within the selected I/O subsystem, the number of the particular peripheral device within the selected I/O subsystem being referred to hereinafter as the "device number".

Process control computer 102 outputs serial information on communications bus 104, which information is inputted to microcomputer 10A of each I/O subsystem by means of peripheral device 112A of each I/O subsystem. As will subsequently become clear, each time an eight bit word is received, each I/O subsystem is interrupted. Each time a I/O subsystem is interrupted, it reads the eight bit word inputted to that I/O subsystem and loads that eight bit word into an appropriate location of memory 38. After a number of such eight bit words are loaded into memory 38, the microcomputer 10A is programmed to review the group of words which is has received. The microcomputer then can make a decision as to whether or not its I/O subsystem is the one addressed by process control computer 102. If the I/O subsystem does contain the I/O subsystem number specified by the upper four bits (DB4–DB7) of an eight bit address serially outputted by process control computer 102. Then the microcomputer 10A of that I/O subsystem can select the peripheral device of the second or "public" group of peripheral devices of that I/O subsystem specified by the lower order four bits (DBφ–DB3) of the address. However, if the upper four bits specify a different I/O subsystem number than the one included in the subject I/O subsystem, then that I/O subsystem does not attempt to select any peripheral device in response to the information received from process control computer 102. In this event, one of the other I/O subsystems, such as 109, 110, etc., connected to communications bus 104 will recognize the I/O subsystem number specified by the upper four bits of the address.

As subsequently explained, the selected peripheral device in the selected I/O subsystem can be "enabled" to communicate with the bidirectional data bus 22A in response to an interrupt by that peripheral device so that the subject selected peripheral device can be sensed or written into by microcomputer 10A, (of the selected I/O subsystem). Microcomputer 10A then acts appropriately to communicate with the selected peripheral device by means of bidirectional data bus 22A. It should be noted that other information than peripheral device address information can be outputted via communications bus 104 by process control computer 102; data and control information to be inputted to the selected peripheral device can also be communicated to the selected I/O subsystem via communications bus 104.

Referring now to FIG. 2, I/O subsystem 106 includes microprocessor 10 coupled to bidirectional data bus 22A. I/O subsystem 106 also includes a plurality of peripheral devices, such as 112B and 112C, coupled between bidirectional data bus 22A and equipment 108. Conductor groups 42B and 42C connect peripheral devices 112B and 112C, respectively, to equipment 108, which is controlled by I/O subsystem 106 (For convenience, peripheral device 112A of FIG. 1 is omitted in FIG. 2.)

Input/output system 106 includes a priority encoder 20 having its inputs connected to 32 select/request conductors such as 18A and 18B. Thirty-two select/request conductors, such as 18A and 18B are connected to thirty-two respective peripheral devices such as 112B and 112C 16 of which are in the above-mentioned first or "private" group and 16 of which are in the above-mentioned second or "public" group. Priority encoder 20 produces a "select code" on eight-bit bidirectional bus 22 in response to "encode" signals from the respective peripheral device. The select code is then inputted to microprocessor 10. I/O subsystem 106 also includes select code register 26, which has enable input 24 connected to microprocessor 10 for subsequently enabling the loading of the select code from microprocessor 10 into select code register 26 at an appropriate time. Select code decoder 28 decodes the select code loaded in select code register 26 and produces select signals on thirty-two conductors such as 40A and 40B, which are inputted to thirty-two respective three-state non-inverting buffers, such as 16A and 16B, the outputs of which drive select/request conductors 18A, 18B, etc. when the three-state decoders are "enabled" by an appropriate conductor from bus 14, as subsequently explained.

Bus 14 is utilized to produce an "acknowledge" or enable signal produced by microprocessor 10 in response to an interrupt request signal $\overline{IRQ}$ produced on interrupt conductor 12. Interrupt conductor 12 is connected to an interrupt input of microprocessor 10 and is also connected to interrupt outputs of all thirty-two of the peripheral devices 112B, 112C, etc. The enable signals produced on bus 14, which includes several conductors (N0, N1, N2, and $\overline{MRD}$ of microprocessor 10, as shown in FIG. 3A) are decoded to produce a signal $\overline{ACK}$ (see FIG. 3B) which disables three-state buffers 16A, 16B, etc., during the acknowledge signal, and enables all of the interrupting peripheral devices 112B, 112C, etc., to produce an encode signal on the corresponding one of the select/request conductors 18A, etc., and also enables the priority encoder 20 to produce a unique eight bit select code corresponding to the highest priority interrupting peripheral device on data bus 22A. Microprocessor 10 then reads the select code and stores it in an appropriate location in its memory or in one of its internal registers.

Figure 5:
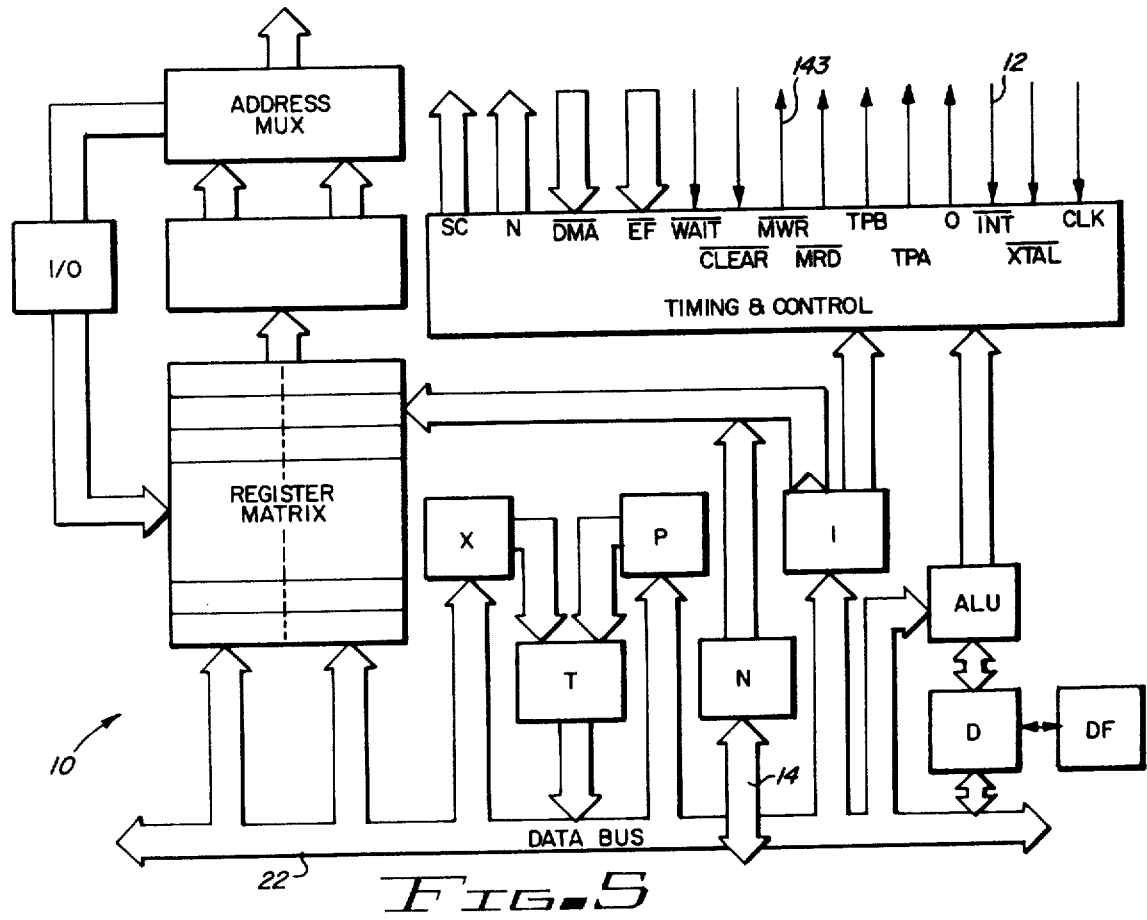
FIG. 5 is a block diagram of the microprocessor of FIG. 2.

Microprocessor 10 can be implemented utilizing a complementary metal oxide semiconductor (CMOS) model SCL1802 microprocessor, manufactured by Solid State Systems Corporation; a substantially similar device having the same model number is also manufactured by RCA. A block diagram of the SCL1802 is shown in FIG. 5. The commercially available devices used to implement the remaining elements in FIG. 2 are given hereinafter with respect to the subsequent discussion of FIGS. 3A–3D. First, however, a general operation of I/O subsystem 106 will be set forth.

Assume that equipment 108 requires additional data to continue operation. Equipment 108 then sends an interrupt signal to one of the peripheral devices 112B, 112C, etc. That peripheral device generates an interrupt request singal $\overline{IRQ}$ on interrupt conductor 12, which conducts the $\overline{IRQ}$ signal to an interrupt input of microprocessor 10, thereby interrupting the execution of the software currently being executed by microprocessor 10. Microprocessor 10 then makes a decision to service the interrupting device, loads its internal operating registers onto a "stack" portion of memory 38, and is then ready to service the interrupt. Software which accomplishes the preceding tasks can be readily implemented by those skilled in this art.

Microprocessor 10 then generates an "acknowledge" message on bus 14. (As subsequently explained, outputs N0, N1, N2, and $\overline{MRD}$ of microprocessor 10 are decoded to produce an "acknowledge" signal, designated by $\overline{ACK}$, which performs the "acknowledge" functions now described with respect to FIG. 2.) The signal $\overline{ACK}$ sets three-state buffers 16A, 16B, etc. into their high impedance output states, so that select/request conductors 18A, 18B, etc., are electrically isolated from select code decoder 28. $\overline{ACK}$ also is inputted to all of the peripheral devices 112B, 112C, etc. causing a logical ANDing of the above interrupt signal from equipment 108 and $\overline{ACK}$ to produce an "encode" signal on the select/request conductor connected to the interrupting peripheral device. The encode signal is inputted to the appropriate input of priority encoder 20. The $\overline{ACK}$ signal also enables priority encoder 20, thereby causing it to generate an eight bit "select code" corresponding to the encode signal and transmit that select code on data bus 22A, whereby the select code is inputted to microprocessor 10 and stored in an appropriate location of memory 38.

When the "acknowledge" operation is complete, $\overline{\text{ACK}}$ goes to a logical zero, and microprocessor 10, in accordance with its operating software, outputs the same select code (earlier produced by priority encoder 20) onto bus 22A. Microprocessor 10 also produces a "load select code" message on outputs N0, N1, N2 and $\overline{\text{MRD}}$, which message is decoded to produce a "load select code" signal (designated $\overline{\text{WRDV}}$ in FIG. 3B), on conductor 24. The load select code signal enables that select code to be loaded into select code register 26. The select code is then immediately decoded by select code decoder 28 to produce a logical "one" on the one of select/request conductors 40A, 40B, etc., connected to the input of the three-state buffers driving the interrupting peripheral device. When $\overline{\text{ACK}}$ goes to zero, three-state buffers 16A, 16B, etc., are all enabled, so the above logical "one" is produced on the select/request conductors connected to the interrupting peripheral device. The outputs of priority encoder 20 are also disabled from the respective conductors of data bus 22A. Thus, it is seen that microprocessor 10 utilizes the same select code previously generated by priority encoder 20 (in response to the interrupting peripheral device) to subsequently select that interrupting peripheral device. The selection of the interrupting peripheral device causes that interrupting peripheral device to be enabled to communicate with the appropriate conductors coupling that peripheral device to data bus 22. Thus, microprocessor 10, in accordance with the accessed interrupt service subroutine, can output data via data bus 22 and the interrupting peripheral device to the appropriate conductors connecting the interrupting peripheral device to equipment 108. Or, microprocessor 10 can read information from the appropriate conductors of equipment 108, via the interrupting peripheral device and bus 22, thereby servicing equipment 108 in response to the original interrupt signal.

If necessary, microprocessor 10 can communicate (via peripheral device 112A) with process control computer 102 of FIG. 1 in the course of, prior to, or subsequent to the above servicing of equipment 108.

The interrupt service subroutine executed by microprocessor 10 in servicing the interrupting peripheral device is accessed by means of an address obtained from a table stored in memory 38. The stored table contains addresses of all of the interrupt service routines corresponding to the various select codes (produced by priority encoder 20). Therefore, the interrupt service subroutines do not have to generate the select information required to enable the interrupting peripheral device to communicate with the bidirectional data bus. This results in a software savings in comparison with a polled interrupt system. This approach saves a substantial amount of hardware over a system wherein the priority encoder output is utilized to generate the address of the service subroutine, which then has to produce address information which permits the processor to select the interrupting peripheral device. This technique also provides a substantial savings in hardware over systems in which the interrupting peripheral device generates the address of the required service subroutine.

Referring now to FIG. 3A, microprocessor 10 includes an interrupt input connected to $\overline{\text{IRQ}}$ conductor 12, a WAIT input, several timing outputs TPA and TPB, and a memory address bus 36 (which is coupled to memory 38 of FIG. 1), data bus conductors DB0–DB7, indicated by reference numeral 22A, and four output signals utilized to conduct input/output instructions, including outputs N0, N1, N2, and $\overline{\text{MRD}}$ (memory read) on conductors 140, 141, 142, and 143, respectively.

$\overline{\text{MRD}}$ is inputted to flip flop 60, which produces a signal called INPUT on conductor 162. When INPUT equal to a logical "one", an "I/O read" instruction is being executed, whereas if INPUT is a logical "zero", then an "I/O write" instruction is being executed.

Figure 3B:
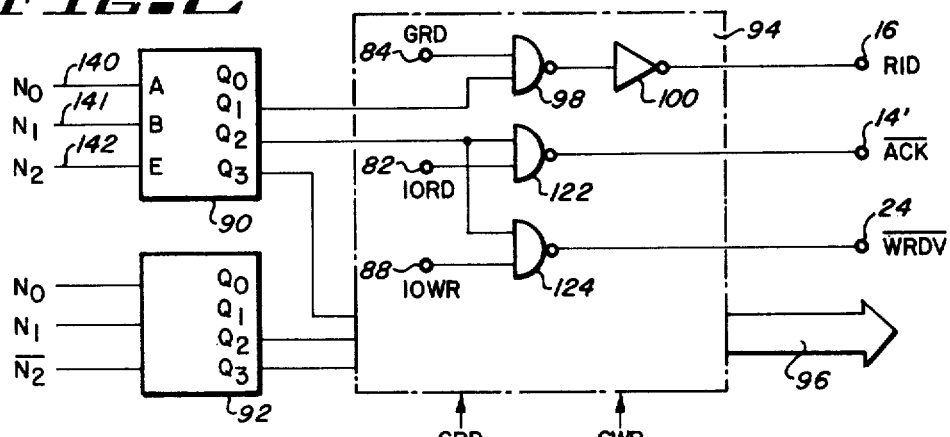
FIG. 3B is a partial logic diagram showing circuitry for decoding acknowledge signals produced by the microprocessor of FIG. 3A.
Figure 3A:
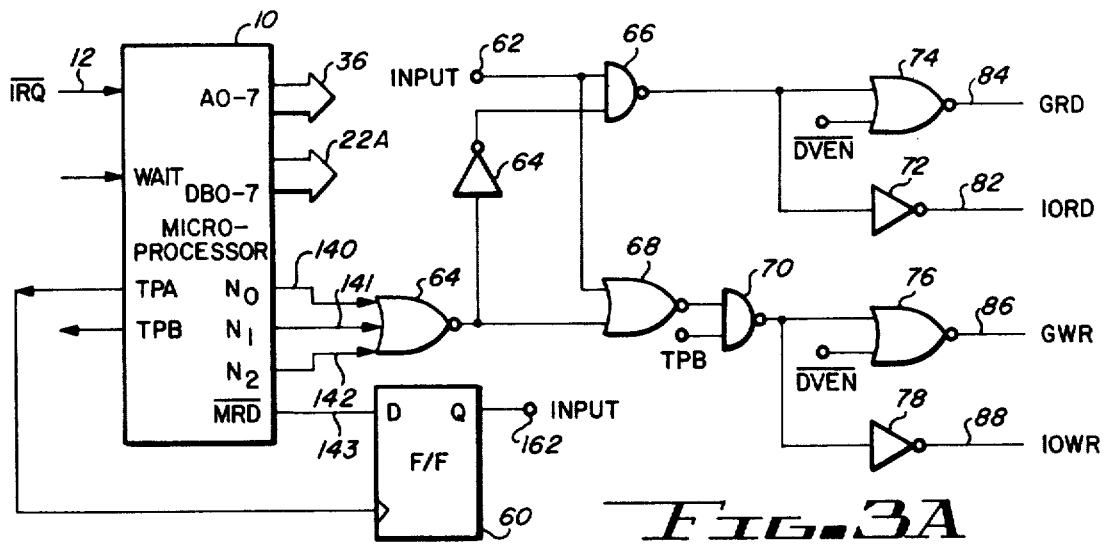
FIG. 3A is a partial logic diagram showing a microprocessor and circuitry generating control signals for the input/output subsystem of FIG. 2.
Figure 4:
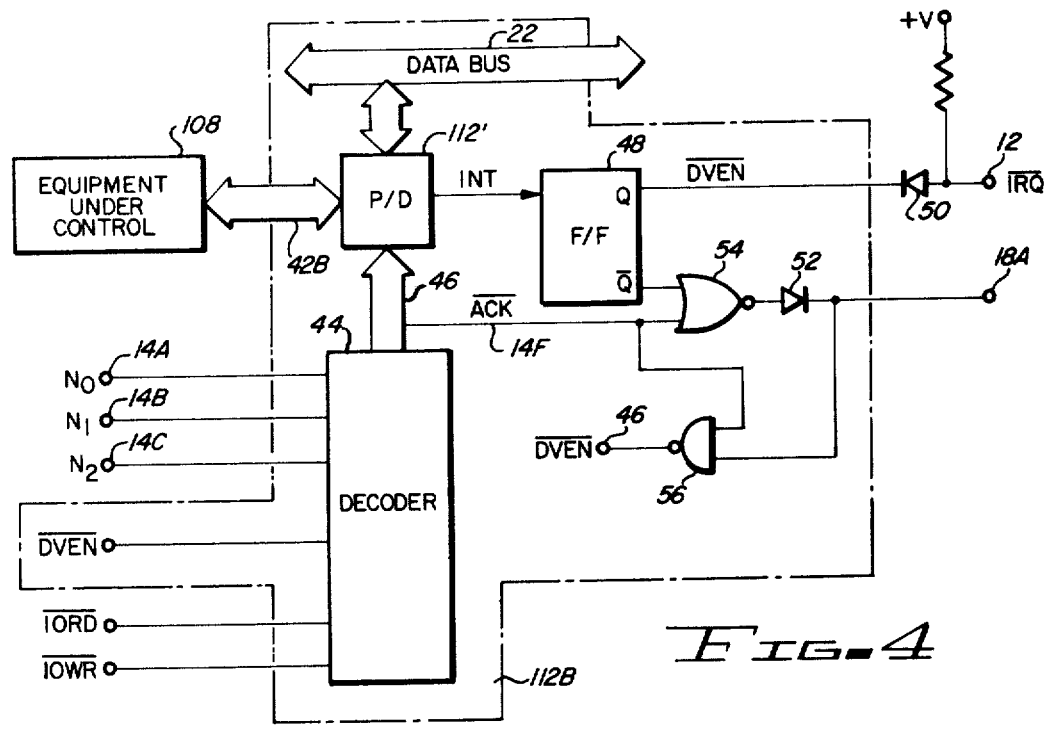
FIG. 4 is a partial logic diagram showing circuitry associated with a peripheral device for decoding the acknowledge signals from a microprocessor and enabling the interrupting peripheral device to communicate with the priority encoder and to enable the selected peripheral device to communicate with the data bus.

The additional logic gates shown in FIG. 3A are utilized to decode N0, N1, N2, and $\overline{\text{MRD}}$ to produce signals needed to accomplish execution of seven I/O read instructions and seven I/O write instructions. The condition that N0, N1, and N2 are all equal to zero does not represent an I/O instruction, and therefore is not decoded as an I/O instruction. Still referring to FIG. 3A, the signals IORD (input/output read), GRD (gated read), GWR (gated write), and IOWR (input/output write) corresponding to the various combinations of N0, N1 and N2 are produced on conductors 82, 84, 86, and 88, respectively. The $\overline{\text{DVEN}}$ (device enable) input to NOR gates 74 and 76 is generated in circuitry analogous to flip flop 48, NOR gate 54, diode 52, and NAND gate 56 in FIG. 4; this circuitry in FIG. 4 is duplicated in each peripheral device and is also provided to produce the $\overline{\text{DVEN}}$ signals required in FIG. 3A.

FIG. 3B illustrates additional decoding of N0, N1, and N2 to produce the request acknowledge signal $\overline{\text{ACK}}$ on conductor 14' and the signal $\overline{\text{WRDV}}$ (write device) on conductor 24, utilized to enable the select code to be inputted to select code register 26 of FIG. 2. A number of other signals generally indicated by reference numeral 96 are also produced in response to decoding of N0, N1, N2, and $\overline{\text{MRD}}$. However, the detailed logic is not shown, because these signals are not necessary to understanding of the present invention.

Figure 3C:
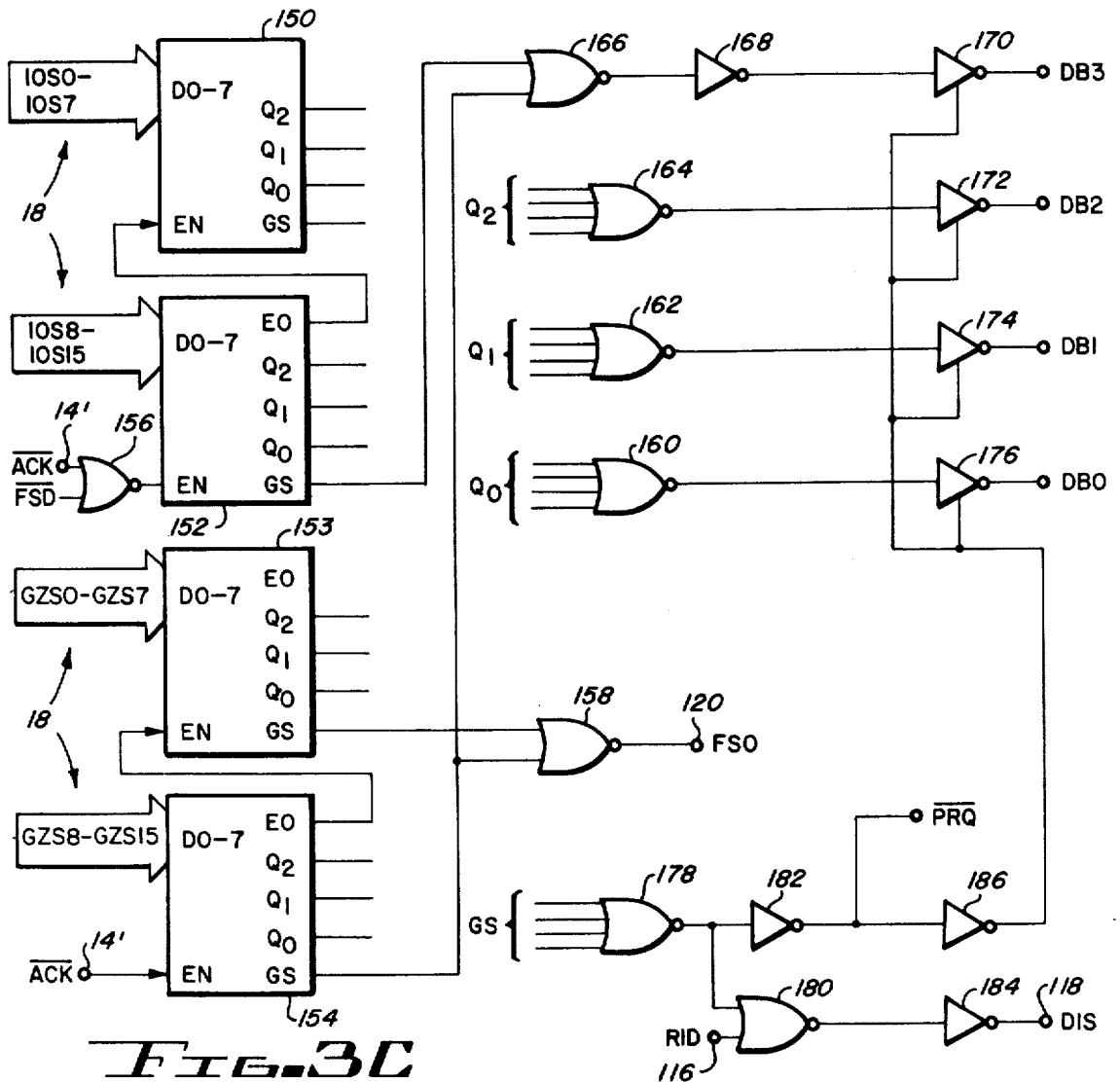
FIG. 3C is a partial logic diagram showing a portion of the priority encoder of FIG. 2.
Figure 3D:
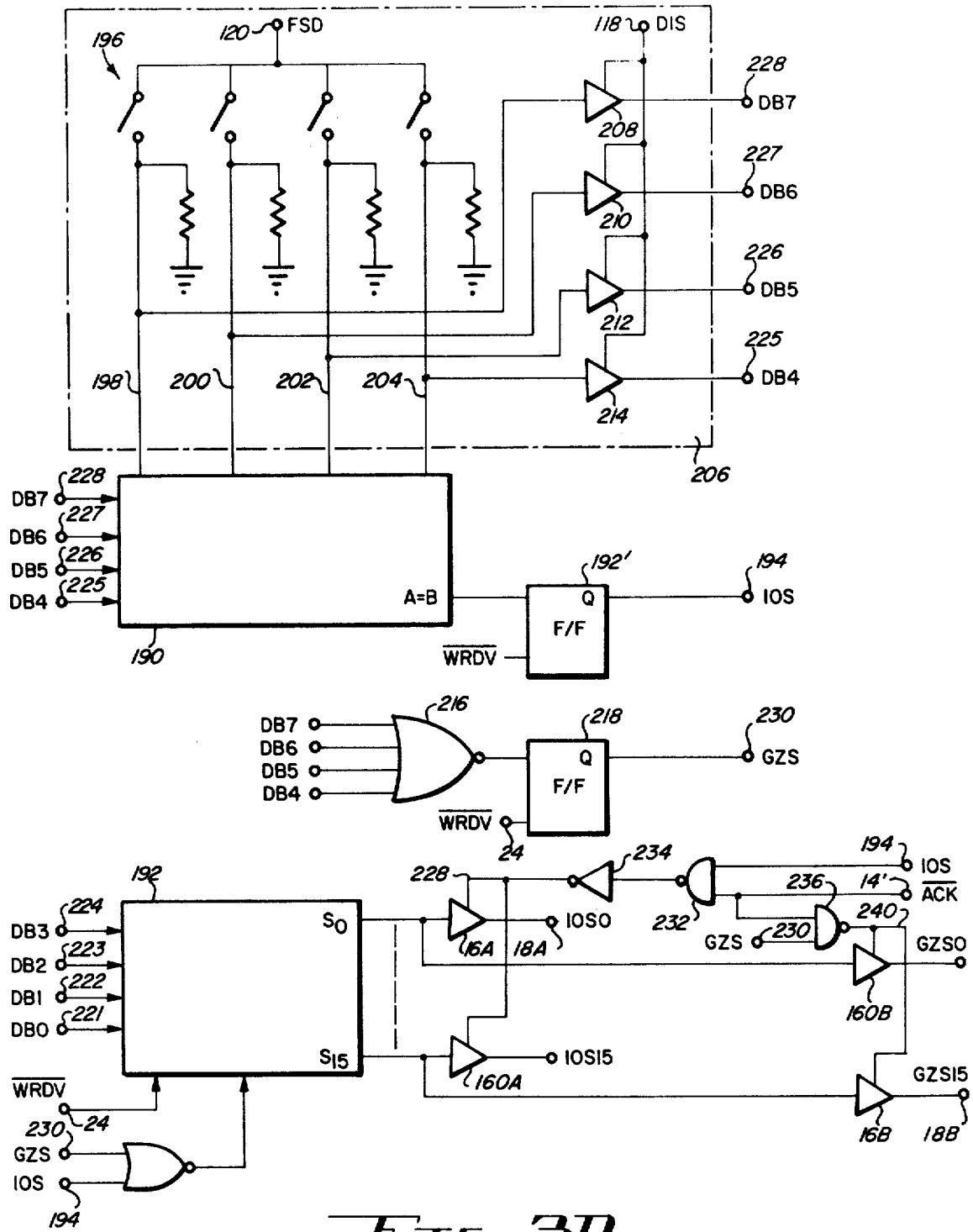
FIG. 3D is a partial logic diagram showing a portion of the priority encoder of FIG. 2 and also showing the select code decoder and associated three-state buffers of FIG. 2.

Referring now to FIG. 3C and to portion 206 of FIG. 3D, priority encoder 20 of FIG. 2 includes four Motorola MC14532B encoders 150, 152, 153 and 154. Each of the MC14532B encoders includes eight inputs and an enable input. Encoders 150 and 152 receive the sixteen select/request lines generally designated by reference numeral 18 and also designated by the designations IOS0–IOS15, as shown in FIG. 3D. Encoders 153 and 154 receive the select/request lines designated GZ0–GZ15, as also shown in FIG. 3D. Each of the encoders 150–154 has four outputs, labeled Q0, Q1, Q2, and GS. A logical "one" appears on the GS output if any of the D0–D7 inputs and the enable input of that encoder is at a logical "one". The GS outputs of encoders 153 and 154 are inputted to NOR gate 166. The output of NOR gate 166 is connected to the input of inverter 168. The output of inverter 168 is connected to the input of non-inverting three-state buffer 170, the output of which is connected to DB3. NOR gates 160, 162, and 164 have their inputs connected, respectively, to the Q0, Q1, and Q2 outputs of encoders 150, 152, 153, and 154.

The outputs of NOR gates 160, 162, and 164 and inverter 168 produce the select code for the device number represented by the lower four bits DB0, DB1, DB2, and DB3, respectively. The select code for the device number is gated to the lower four bits of data bus 22 when the output gate of inverter 186 is at a logical one. The latter condition occurs when any of the GS inputs to OR gate 178 is at a logical "one", i.e., when any of the signals IOS0–IOS15 or GZ0–GZ15 is at a logical "one". This happens if any of the thirty-two peripheral devices receive an interrupt signal and are enabled by $\overline{ACK}$.

The select code for the I/O subsystem number represented by the upper four bits of data bus 22A is produced by the cooperation of NOR gate 158 in FIG. 3C (which produces a signal FSD (file switch drive) on conductor 120) and circuitry 206 of FIG. 3D. Referring now to FIG. 3D, circuitry 206 includes four three-state non-inverting buffers 208, 210, 214, having their outputs connected, respectively, to DB7, DB6, DB5, and DB4. The inputs of three-state buffers 208, 210, 212 and 214 are connected, respectively, to inputs 198, 200, 202, and 204 of comparator 190, which is part of the select code decoder, as subsequently explained. The comparator 190 can be implemented by a Motorola MC14585 comparator. Each of inputs 198, 200, 202, and 204, is terminated to ground by a resistor, as indicated, and is also connected to respective area of four "strapping switches", generally indicated by reference numeral 96, and each having a terminal connected to conductor 120, which receives the FSD signal mentioned above. The four strapping switches 196 are set to "recognize" one of the above-mentioned four bit device group select code numbers produced on DB4–DB7 by microprocessor 10 in response to information received from process control computer 102 in FIG. 1 in order to select a particular I/O subsystem. NOR gate 158 of FIG. 3C produces a logical "zero" during an acknowledge operation in response to an interrupt request signal if there is an encode signal produced by one of the peripheral devices which receive the signals GZS0–GZS15 (FIG. 3D). This causes inputs 198, 200, 202, and 204 of three-state buffers 208, 210, 212 and 214 of FIG. 3D to be forced to ground. The DIS signal on conductor 118 enables the three-state buffers 208, 210, 212, and 214 to produce zeros on DB4–DB7 during the above-described "acknowlege" operations.

At any other time, FSD is at a logical "one", and the states set by strapping switches 196 are forced onto the upper four bits of data bus 22 when DIS is at a logical "one". Thus, the signals outputted by priority encoder 20 on bits DB0–DB7 of data bus 22 represent the location of the highest priority interrupting device during an acknowledge operation.

Still referring to FIG. 3D, the lower four bits of select code register 26 (FIG. 2) and the lower four bits of select code decoder 28 (FIG. 2) are implemented utilizing a Motorola MC14514B four bit latch/four-to-sixteen line decoder 192 (FIG. 3D), which decodes bits DB0–DB3 of bidirectional data bus 22 to produce sixteen outputs S0–S15; this four bit latch/decoder is designated in FIG. 3D by reference numeral 192. Each of the sixteen outputs S0–S15 is connected to the input of two three-state non-inverting buffers, such as 16A, 160B, 160A, and 16B. The first group of three-state non-inverting buffers is enabled by a conductor designated by reference numeral 228. Conductor 238 produces a signal which is the logical AND of a signal IOS and $\overline{ACK}$. The outputs of the first group of three-state buffers are designated by IOS0–IOS15 and are connected to enable or select inputs of respective ones of the above-mentioned first or "private" or "overhead" group peripheral devices included in the group of peripheral devices 112A, 112B . . . 112C of FIG. 1. The second group of three-state buffers is gated by a signal on conductor 240. That signal on conductor 240 is the logical AND of $\overline{ACK}$ and a signal GZS applied to node 230. The outputs of the second group of three-state buffers are designated GZS0–GZS15, and are connected to enable or select inputs of respective ones of the above-mentioned second or "public" group of peripheral devices included in the group of peripheral devices 112A, 112B . . . 112C of FIG. 1. The conductors IOS0–IOS15 and GZS0–GZS15 constitute the thirty-two select/ request conductors designated by reference numeral 18 in FIG. 2.

The GZS signal on node 230 is produced by the coincidence of the upper four bits DB4–DB7 of data bus 22A being equal to a logical "zero" and the occurrence of the $\overline{WRDV}$ signal producing a logical "one" in flip flop 218 in FIG. 3D. If DB4–DB7 are all logical "zeros", microprocessor 10 can access the group of peripheral devices connected to the inputs of the second (i.e., the private) group of three-state buffers enabled by conductor 240. It should be noted that process control computer 102 is never allowed to communicate with that "private" group of peripheral devices, as subsequently explained.

Still referring to FIG. 3D, the upper four bits DB4–DB7 in select code register 26 of FIG. 2 are "decoded" by comparator 190 to determine if DB4–DB7 matches the code established by strapping switches 196. If such a match does exist, a logical "one" is stored in flip flop 192', producing the signal IOS on conductor 194. This causes the first group of three-state buffers connected to conductor 228 to be enabled when the acknowledge operation is not occurring. Thus, process control computer 102 can select a peripheral device of the second or "public" group of peripheral devices by specifying the I/O subsystem number. This specifies one of the I/O subsystems connected to the communications bus. Control process computer 102 also specifies the lower four bits DB0–DB3, which select one of the sixteen peripheral devices within the second or "public" group of peripheral devices in the selected I/O subsystem. However, if DB4–DB7 are all logical zeros, then the first or "private" group of peripheral devices in each I/O subsystem are capable of being selected only by the respective microprocessors 10 thereof. The first or "private" second group of peripheral devices is also referred to as the "overhead" peripheral devices, as previously mentioned. The "overhead" peripheral devices are capable of being operated upon by the respective microprocessors 10 in the I/O subsystems without any information from control processor 102.

FIG. 6 discloses input/output address maps for a control computer such as process control computer 102 in FIG. 1 and a plurality of associated I/O subsystems, such as 106, 109 and 110 of FIG. 1. I/O address map 305 represents the I/O addresses accessible by the process control computer. The I/O addresses represented include the addresses of sixteen I/O device groups such as those indicated by reference numerals 308, 309 and 311. The "sections" (such as 307, 308, 309, 311 of FIG. 6) of map 305 numbered 0, 1, 2 . . . 15, respectively, each correspond to one of these device groups, each of which can include up to sixteen I/O peripheral devices such as 112B, 112C of FIG. 1.

The group zero portion (numbered "0") of each of the I/O subsystem "possible I/O maps" corresponds to the "private" I/O address space" available to the microprocessor 10 each of the I/O subsystems, but not accessable by the process control computer, as will be subsequently explained. The I/O address space accessable by control processor 102 is referred to as the "public I/O address space", and corresponds to peripheral devices, such as relays, digital to analog converters, analog-to-digital coverters, etc., utilized to permit the control processor to control and respond to the equipment 108 during ordinary operation of equipment 108. The "private I/O address space" includes elements such as programmable power supplies, flag registers and such elements of the kind that do not need to be attended to by control computer 102, but can be routinely attended to by microprocessor 10.

Each microprocessor 10 has the capability of periodically addressing the I/O peripheral devices in the above-mentioned "public "overhead" address space" to perform "housekeeping" tasks, such as setting flags, servicing timers, and the like in its own I/O subsystem without explicit commands from the process control computer 102 while process control computer 102 is accessing another of the I/O subsystems.

It should be noted that there are two separate types of address space in the system of FIG. 1, one representing the addresses of memory 38, and one representing the I/O addresses of the I/O peripheral devices 112B, 112C, etc. of each of the I/O subsystems such as 106, 109, and 110 of FIG. 1. (Some other computers alternatively includes the I/O address space within the memory address space, whereby I/O peripheral devices are addressed in the same manner as locations in the memory.)

Each of the I/O subsystems 1, 2, ... etc, of FIG. 6 is actually capable of accessing only thirty-two peripheral devices, including the first group of sixteen "overhead" or "private" peripheral devices contained in device "group zero" of each of the I/O address maps in FIG. 6 and also including the second public sixteen peripheral devices in one of the fifteen remaining device groups determined by the settings of strapping switches 196 in FIG. 3D. In FIG. 6, sections 308 of I/O address map 301 and section 311 of I/O address map 303 are cross-hatched to indicate that the corresponding peripheral devices are accessible by the microcomputer such as 10A of FIG. 1.

The other sections of the I/O address maps represent peripheral device groups which could possibly be accessed by microcomputer 10A (FIG. 1) for alternative settings of strapping switches 196 of FIG. 3D. Thus, each of the I/O address maps 301 and 303 actually represents the "possible I/O address space" of the corresponding microcomputers 10A of the corresponding I/O subsystems.

In summary then, for each I/O address map in FIG. 6, the "group 0" section, such as 307, represents the "private peripheral device address space" of the corresponding I/O subsystem. One of the remaining fifteen sections of each I/O subsystem (eg. section 308 of map 301) is cross-hatched to represent the "public address space" of the corresponding I/O subsystem; the remaining sections correspond to alternative settings of strapping switches such as 196 of FIG. 3D.

The immediately following discussion relates to the previously described elements of the drawings cooperating to produce system operation resulting in the I/O address maps of FIG. 6.

First, the circuitry in FIG. 3D, including NOR gate 216, flip flop 218, and the circuitry of FIG. 3B producing the $\overline{WRDV}$ signal applied to flip flop 218 to produce the GZS signal on node 230, cooperates with NAND gate 236 in FIG. 3D to produce the enable signal on conductor 240 to enable decoder 192 to select one of the above-mentioned sixteen "overhead" I/O peripheral devices receiving the select signals GZS0–GZS15. Thus, unless DB4–DB7 are all logical "zeros" at $\overline{WRDV}$ time, microprocessor 10 of FIG. 2 is incapable of accessing the sixteen "overhead" peripheral devices. (It should be noted that process control computer 102 of FIG. 1 is always isolated from the sixteen "overhead" peripheral devices, since it always addresses the peripheral devices indirectly, by inputting I/O address information into microprocessor 10, as explained previously. It should also be noted that microprocessor 10 is programmed to disregard any I/O address from control processor 102 wherein DB4–DB7 are all "zeros". Microprocessor 10 then directly accesses the addresses peripheral device of the addressed I/O subsystem, assuming that the stored program being executed by microprocessor 10 outputs the same address code received from control processor 102 via communications bus 104 (FIG. 1).)

It should be realized that (assuming the microprocessor outputs the same I/O address code that it receives from the process control computer 102) the elements previously described with respect to the drawings cooperate to cause the I/O subsystem to ignore any request by process control computer 102 to access the "overhead" peripherals. If, however, microprocessor 10 wishes to access the "overhead" peripherals (which are enabled by the GZS signal derived from NOR gate 216 in FIG. 3D), and that I/O subsystem is not the one selected by process control computer 102, microprocessor 10 outputs "zeros" on DB4–DB7, thereby enabling the peripheral devices receiving GZS0–GZS15 when DB4–DB7 are all zeros (the "group 0" condition). The particular one of the peripheral devices determined by DB0–DB3 is then addressed by microprocessor 10. Thus, the above-described circuitry of each I/O subsystem cooperates to ensure microprocessor 10 of that I/O subsystem of the existance of the "private I/O address space" designated by the numeral 0 in maps 301 and 303 of FIG. 6.

The circuitry which permits microprocessor 10 to access only the one of the fifteen remaining groups (numbered 1–15) of peripheral devices, as determined by the settings of the strapping switches 196, establishes cross-hatched sections such as 308 of I/O address map 301 and cross-hatched section 311 of I/O address space 303 in FIG. 6.

It should be noted that microprocessor 10 also has the capability of reading the states of the strapping switches 196. This permits microprocessor 10 to know whether or not to respond to a command or address received from processing computer 102. (The four strapping switches 196 are included in the above-described private I/0 address space.)

The above-described circuitry of FIG. 2D (including the strapping switches 196) cooperating to produce the IOS signal and the enable signal on node 238, and the GZS signal and the corresponding enable signal on node 240 allows all of the identical I/O subsystems such as 106, 109, 110 (FIG. 1) to co-exist in the same larger system without having to be different with respect to hardware or software which allows them to be "selected" by process control computer 102. Thus, all of the I/O subsystems in the entire process control system can use the same I/O address space and associated circuitry and software for their "overhead" peripheral devices.

I claim:

1. A method of operating a control system including a control computer and a plurality of input/output subsystems each including first and second groups of peripheral devices coupling said control computer to input and/or output elements of an equipment system to effect accessing of various ones of said peripheral devices, each of said input/output subsystems including a respective microcomputer and an internal bus having first and second groups of conductors, said method comprising the steps of:

(a) transmitting first and second groups of peripheral address bits from said control computer to said microcomputers in said input/output subsystems;

(b) transmitting said first and second groups of peripheral address bits from said respective microcomputers along first and second groups of conductors, respectively, of said internal buses of each of said input/output subsystems, said second group of peripheral address bits containing information that is different than a first predetermined code;

(c) selecting said second group of peripheral devices in a first one of said input/output subsystems to be accessed by said microcomputer of said first input/output subsystem if said second group of peripheral address bits matches a second predetermined code stored in said first input/output subsystems, said second predetermined code being different from said first predetermined code;

(d) accessing a one of said peripheral devices of said second group in said first input/output subsystem and determined by said first group of peripheral address bits;

(e) transmitting a group of bits containing said first predetermined code from said microcomputer of said first input/output subsystem along said second group of conductors of said internal bus of a second input/output subsystem;

(f) selecting said first group of peripheral devices in said second input/output subsystem in response to said transmitted group of bits containing said first predetermined code; and (g) accessing a one of said peripheral devices that is determined by any first group of peripheral address bits transmitted by the microcomputer of said second input/output subsystem and that is in said first group of said second input/output subsystem.

2. A control system for controlling an equipment system, said control system comprising in combination:

(a) a control processor for executing instructions of a control program to control said equipment system;

(b) a plurality of input/output subsystems, each of said input/output subsystems being coupled to said equipment system, for effecting transferring of information between said elements and said control processor, each of said input/output subsystems including:

i. a microcomputer;

ii. first and second groups of peripheral devices coupled to various ones of said elements;

iii. decoding means for decoding address information outputted by said microcomputer to effect selecting of said peripheral devices;

iv. internal bus means including first and second groups of conductors for transmitting address information from said microcomputer to said decoding means;

v. means for transmitting a first group of peripheral device address bits and a second group of peripheral device address bits from said control processor to said microcomputer, said second group of peripheral device address bits never containing a first predetermined code;

vi. means separate from said microcomputer in said input/output subsystem for recognizing a second predetermined code contained in said second group of peripheral device address bits when said second group of peripheral device address bits is transmitted on said second group of conductors by said microcomputer, said second predetermined code being different than said first predetermined code;

vii. means for enabling said second group of peripheral devices to be accessed by said microcomputer in response to said second predetermined code;

viii. means separate from said microcomputer for recognizing said first predetermined code in said second group of peripheral device address bits when said second group of peripheral address bits is transmitted on said second group of conductors by said microcomputer;

ix. means for enabling said first group of peripheral devices to be accessed by said microcomputer in response to said first predetermined code;

(c) means for coupling said plurality of input/output subsystems to said control processor; and (d) means for selecting a particular one of the peripheral devices in said first group or said second group in response to address information transmitted on said first group of conductors by said microcomputer.

* * * * *